United States Patent
Fitzpatrick et al.

(10) Patent No.: US 9,460,423 B2
(45) Date of Patent: Oct. 4, 2016

(54) TASK PRIORITIZATION AND OPTIMIZATION USING INTERCONNECTED DATA SOURCES

(71) Applicant: International Business Machines Corporation, Armonk, NY (US)

(72) Inventors: Gregory P. Fitzpatrick, Keller, TX (US); Ramya Hari Hara Prasad, Pune (IN); Girish Sundaram, Pune (IN)

(73) Assignee: International Business Machines Corporation, Armonk, NY (US)

( * ) Notice: Subject to any disclaimer, the term of this patent is extended or adjusted under 35 U.S.C. 154(b) by 233 days.

(21) Appl. No.: 14/254,112

(22) Filed: Apr. 16, 2014

(65) Prior Publication Data
US 2015/0300829 A1    Oct. 22, 2015

(51) Int. Cl.
*G06Q 10/10*     (2012.01)
*G01C 21/34*     (2006.01)

(52) U.S. Cl.
CPC ......... *G06Q 10/1097* (2013.01); *G01C 21/343* (2013.01)

(58) Field of Classification Search
CPC ........... G06Q 10/06; G06Q 10/06311; G06Q 10/063114; G06Q 10/047; G06Q 10/1097; G06Q 50/30; G06Q 10/06312; G01C 21/3415; H04W 4/02; H04W 4/12; H04W 4/046
USPC ............... 701/414, 423, 410, 533, 408, 468; 455/456.1, 456.3; 705/7.13, 7.15, 7.19, 705/7.18, 7.24, 7.21, 7.27; 340/539.13; 709/203, 242
See application file for complete search history.

(56) References Cited

U.S. PATENT DOCUMENTS

| | | | | |
|---|---|---|---|---|
| 2008/0082651 | A1* | 4/2008 | Singh | G06Q 10/109 709/224 |
| 2009/0210143 | A1 | 8/2009 | Seltzer et al. | |
| 2010/0077400 | A1 | 3/2010 | Ioannou | |
| 2012/0278388 | A1* | 11/2012 | Kleinbart | G06Q 10/06 709/204 |
| 2013/0013191 | A1 | 1/2013 | Dillahunt et al. | |
| 2013/0283211 | A1* | 10/2013 | Malkin | G06Q 10/06 715/844 |
| 2014/0108078 | A1* | 4/2014 | Davis | G06Q 10/06311 705/7.14 |
| 2014/0195951 | A1* | 7/2014 | Lee | G06Q 10/109 715/771 |
| 2014/0278071 | A1 | 9/2014 | San Filippo et al. | |

OTHER PUBLICATIONS

"Moving at the Speed of Life", fastertx.com—HCA North Texas, provided in the main idea of disclosure by inventor on Apr. 24, 2013, <http://fastertx.com/>.

"Optimization of to-do item suggestion", Authors Disclosed Anonymously, IP.com Prior Art Database Technical Disclosure, IPCOM000229983D, Aug. 12, 2013.

U.S. Appl. No. 15/043,748, Entitled "Task Prioritization and Optimization Using Interconnected Data Sources", filed Feb. 15, 2016.

Appendix P.: List of IBM Patents or Patent Applications Treated as Related, Dated Feb. 15, 2016, 2 pages.

* cited by examiner

*Primary Examiner* — Marthe Marc-Coleman
(74) *Attorney, Agent, or Firm* — Isaac J. Gooshaw (57) ABSTRACT

A computer identifies a location that is associated with a task, included in a first list of tasks, based on a first information. The computer determines a first travel time from a second location that is associated with a mobile device to the first location based on a second information. The second information indicates an amount of travel time that is associated with a route from the second location to the first location. The computer generates a plurality of permutations of the tasks included in the first list of tasks. The computer selects a permutation from the plurality of permutations based on the first travel time. The computer generates a second list of tasks using the selected permutation. The organization of the tasks included in the second list of tasks reduces the travel time that is required to complete those tasks.

20 Claims, 3 Drawing Sheets

FIG. 3

TASK PRIORITIZATION AND OPTIMIZATION USING INTERCONNECTED DATA SOURCES

BACKGROUND OF THE INVENTION

The present invention relates generally to the field of task management, and more particularly to task prioritization.

Task management is the process of managing task through their life cycle and typically involves planning, testing, tracking and reporting. Task management applications allow users to visualize which tasks are to be completed over a particular period of time and thereby assist users manage their schedules effectively. Effective task management requires managing many aspects of a task, including associated status, priority, time, human and financial constraints, recurrence and notification. However, unforeseen complications can inhibit the completion of the tasks included in those schedules. For example, users may be stuck in traffic jams, waiting in lines, or waiting for delayed public transportation, and are thus unable to complete tasks that they set out to complete.

SUMMARY

Embodiments of the present invention disclose a method, computer program product, and system for prioritizing tasks. A computer identifies a first location that is associated with a first task, based, at least in part, on first information, wherein the first task is included in a first list of tasks. The computer determines a first travel time from a second location to the first location based, at least in part, on a second information, wherein the second location is associated with a mobile device that supplied the first list of tasks, and wherein the second information includes data that indicates an amount of travel time that is associated with a route from the second location to the first location. The computer generates a plurality of permutations of the tasks included in the first list of tasks, wherein each permutation, of the plurality of permutations, respectively includes at least two of the tasks included in the first list of tasks. The computer selects a first permutation from the plurality of permutations based, at least in part, on the first travel time. The computer generates a second list of tasks based, at least in part, on the selected first permutation of the tasks, wherein an organization of the tasks included in the second list of tasks reduces at least a second travel time that is required to complete at least a portion of the tasks included in the second list of tasks.

DETAILED DESCRIPTION

The present invention will now be described in detail with reference to the Figures.

Figure 1:
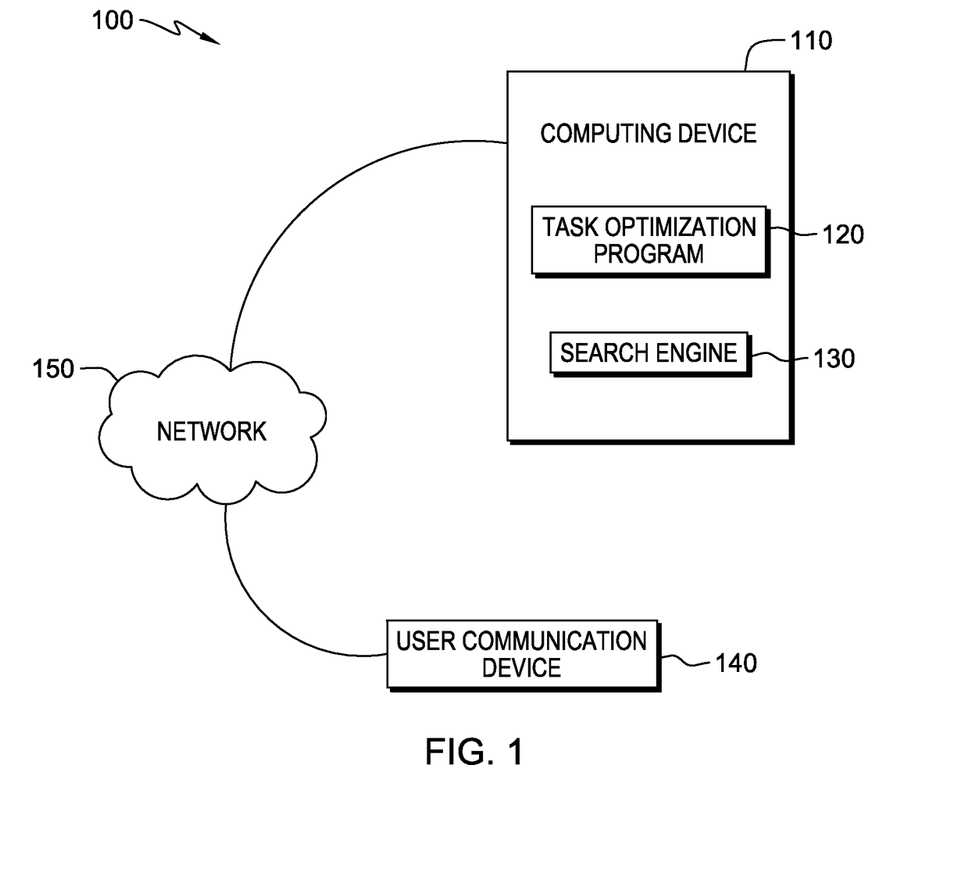
FIG. 1 is a functional block diagram illustrating a distributed computing environment, in accordance with an embodiment of the present invention.

FIG. 1 is a functional block diagram illustrating a distributed computing environment, generally designated 100, in accordance with one embodiment of the present invention. Distributed computing environment 100 includes computing device 110, user communication device 140 all interconnected over network 150. Computing device 110 includes task optimization program 120 and search engine 130.

In an embodiment, task optimization program 120, and search engine 130 are stored on computing device 110. However, in other embodiments, task optimization program 120, and search engine 130 are stored externally and accessed through a communication network such as network 150. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between computing device 110, user communication device 140, task optimization program 120, and search engine 130, in accordance with a desired embodiment of the present invention.

In various embodiments of the present invention, computing device 110 can be a server, a laptop computer, a tablet computer, a netbook computer, a personal computer (PC), or a desktop computer. In another embodiment, computing device 110 represents a computing system utilizing clustered computers and components to act as a single pool of seamless resources. In general, computing device 110 can be any computing device or a combination of devices with access to search engine 130, network 150, and user communication device 140 and is capable of executing task optimization program 120, in accordance with an embodiment of the present invention. Computing device 110 may include internal and external hardware components, as depicted and described in further detail with respect to FIG. 3.

In various embodiments of the present invention, user communication device 140 may be a laptop computer, tablet computer, netbook computer, personal computer (PC), a desktop computer, a personal digital assistant (PDA), a smart phone, or any programmable electronic device capable of communicating with computing device 110 and task optimization program 120 via network 150 and with various components and devices within distributed computing environment 100. In this embodiment, user communication device 140 includes hardware and software to determine its global positioning system (GPS) location and to send that location to search engine 130 via network 150. In another embodiment, user communication device 140 represents a computing system utilizing clustered computers and components to act as a single pool of seamless resources. In general, user communication device 140 can be any computing device or a combination of devices with access to network 150 and is capable of communicating with task optimization program 120 via computing device 110, in accordance with an embodiment of the present invention. User communication device 140 may include internal and external hardware components, as depicted and described in further detail with respect to FIG. 3.

In this embodiment, task optimization program 120 is a software program which receives a list of tasks from a mobile device of a user, e.g., communication device 140, and returns a prioritized list of tasks to the mobile device. Task optimization program 120 generates permutations of the tasks included in the list of tasks (i.e., sequences of the tasks) and determines a rating for each permutation. Task optimization program 120 selects the permutation with the best rating and generates an optimized list of the tasks, based on that permutation, and returns that optimized list to user communication device 140. In general, the optimized list of the tasks minimizes the amount of travel time required to complete the tasks included in the list. It is to be understood that the use of the words "optimized" and "optimization" herein refers to an ability to cause an improvement in the time required for task completion, which may not be absolutely optimal in all interpretations or embodiments, since there is often a tradeoff for a given improvement, while the word "optimal" refers to a result of the application of that ability. For example, the completion of one task is optimized while the completion of another task is exacerbated. As such the optimization performed by task optimization program 120 is in reference to the ability of task optimization program 120 to cause an improvement in the time required for completion of at least one task included in the list of tasks.

Search engine 130 is a program, such as a search engine, capable of receiving a search query and returning information related to the received search query. In this embodiment, the returned information included information retrieved from the world wide web. In other words, search engine 130 is a source of digital data, i.e., a digital data source. For example, to identify a particular location where the task can be completed, this information can be, for example, a street address that corresponds to the location associated with a task, a review of a business related to the completion of task, a global positioning system (GPS) coordinate of the location associated with the task, or a mode of transportation that is available to travel to the location associated with the task, which can be further based on the location of the mobile device. In some embodiment, applicable modes of transportation include, for example, roadways, bus routes, train schedules, pedestrian walkways, bike paths etc.

Search engine 130 interacts with task optimization program 120 by providing information related to each task within the list of tasks received from user communication device 140. In some scenarios the provided information includes details that change an estimated travel time, which often relates to a specific route that can be used from a first location to a second location or vice versa. For example, the information can include one or more of: a) a degree of congestion for a mode of transit; b) a measured pattern of movement associated with a mode of transit; c) a pattern of movement for a mode of transit that is predicted to exist; d) a queue length for a mode of transit at the first location; e) a queue length for a mode of transit that is included in the route from the second location to the first location; f) a social media posting related to the first location that indicates a degree of congestion for a mode of transit; g) a current weather condition for the first location; or h) a forecasted weather condition for the first location.

This information is applied, by task optimization program 120, to an algorithm that uses them as variables or data points that are applied to a given route to generate an estimated travel time that accounts for changes in an environment that includes that route. This information can indicate an inhibition of travel, a facilitation of travel or may not affect travel at all, depending on a particular scenario and task to be completed. A degree of congestion for a mode of transit can be, for example, a vehicular traffic jam or heavy pedestrian traffic on a particular sidewalk, which may inhibit those forms of transit. A measured pattern of movement associated with a mode of transit can be, for example, data from surveillance equipment that indicates movement of people or vehicles, which may inhibit or facilitate various forms of transit. A pattern of movement for a mode of transit that is predicted to exist can be, for example, movement of vehicles and people during rush hour, which may inhibit or facilitate forms of transit. A queue length for a mode of transit at the first location can be, for example, long queue lengths to enter a venue or the number of people waiting to board a public transportation system, which inhibits those forms of transit. A queue length for a mode of transit that is included in the route from the second location to the first location can be, for example, the number of vehicles using a highway on ramp, which may inhibit or facilitate vehicular transit. An applicable social media posting related to the first location that indicates a degree of congestion for a mode of transit can be, for example, a message posted on a social media site that indicates airplane flights have been delayed by one hour at a particular airport, which may inhibit that form of transit. An applicable current weather condition for the first location can be, for example, data from weather instruments that indicate sunny conditions with a temperature of seventy degrees Fahrenheit, which may facilitate multiple forms of transit. Lastly, a forecasted weather condition for the first location can be, for example, below freezing temperatures and a predicted snowfall of twelve inches, which may inhibit or facilitate various forms of transit.

By using such information as variables or data points, the algorithm, of task optimization program 120, generates an estimated travel time that accounts for changes in an environment that interacts with a particular route. For example, pedestrian traffic on one side of a city may not affect vehicular traffic on the other. Certain information can therefore indicate an increase in the estimated travel time while other information can indicate a decrease, or neither, since certain environmental condition inhibit travel while other environmental conditions facilitate travel. It should also be noted that certain information can facilitate one mode of transportation while inhibiting another, or may do neither. For example, a snow fall of fifteen inches inhibits automobile and walking modes of transit while facilitating modes of transit that require snow, e.g., a snowmobile and skiing. However, the user of the mobile device is utilizing an underground train system that is not affected by the snow. As such, the algorithm takes into account available modes of transit, which can be specified by the user of the mobile device, when determining an estimated travel time.

Figure 2:
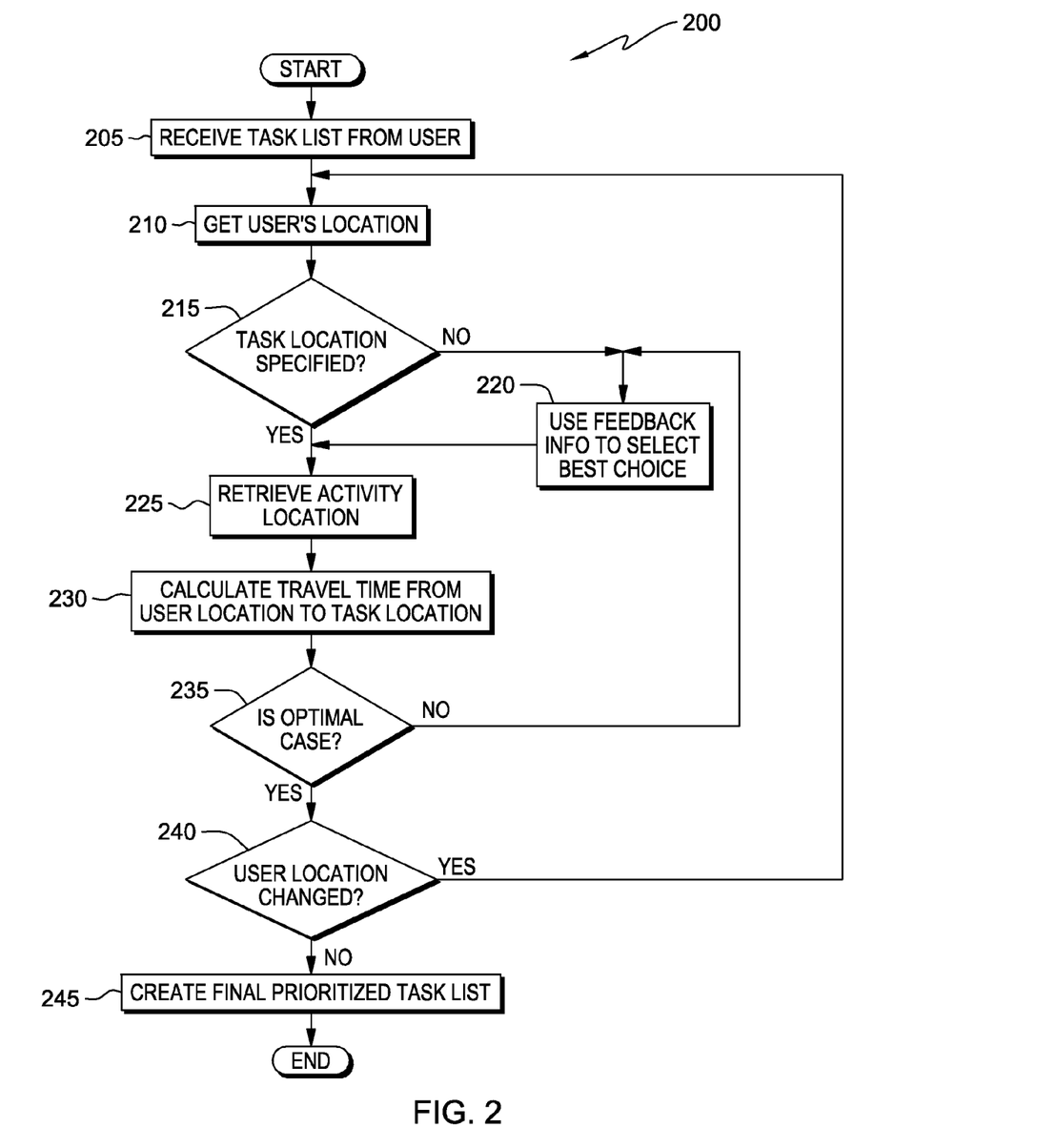
FIG. 2 is a flowchart depicting operational steps of a task optimization program program, on a computing device within the distributed computing environment of FIG. 1, in accordance with an embodiment of the present invention.

FIG. 2 is a flowchart, 200, depicting operational steps of task optimization program 120 for organizing a list of tasks such that the organization of those tasks optimizes their completion, in accordance with an embodiment of the present invention.

In step 205, task optimization program 120 receives a list of tasks from a user of user communication device 140. The list of tasks includes one or more tasks; wherein each task can include a description of an activity to be completed, a location of an activity to be completed, or a combination of the two. Typically, each task in the list of tasks from user communication device 140 includes an associated type of location or a user specified location where a given task is to be completed. For example, a task "get a haircut" is associated, by the user with salon A. In another example, task optimization program 120 associates "get a haircut" with a type of task location such as barbershops and hair salons. In certain embodiments, task optimization program 120 uses search engine 130 to identify types of task locations that will allow the needed resources to complete a given task. In such embodiments, task optimization program 120 associates each received task with at least one possible type of task location, hereafter denoted as a "task location".

The current location of the user, hereafter denoted as a "user location" is calculated by task optimization program 120, in step 210. In this exemplary embodiment, the user location is calculated based on global poisoning system (GPS) co-ordinates. However, in other embodiments the user location is determined based on a proximity to a point of interest or another known location.

Task optimization program 120 determines whether a task, included in the list of tasks, has been specified, i.e., selected by the user, in decision step 215. If the user has made such a specification, i.e., a task was selected, (decision step 215, yes branch), then task optimization program 120 proceeds to step 225. In general, the user may specify any task included in the list of tasks received from user communication device 140, in accordance with an embodiment of the present invention. If however, the user has not made such a specification, i.e., a task was not selected, (decision step 215, no branch), then in step 220, task optimization program 120 individually evaluates the tasks, included in the received list of tasks, based on the task locations associated with the respective tasks. To evaluate the tasks, task optimization program 120 determines and compares the distances, i.e., the amount of travel time required, from each respective task location to the location of user communication device 140. In general, a shorter distance is preferable and, as such the task locations are organized into a list of task locations based on which is task location is closest to user communication device 140. However, in certain embodiments, additional criteria are applied. For example, certain tasks may have higher priority for completion than other tasks and as a result their associated task locations are listed higher in the list of task locations. Based on this evaluation, task optimization program 120 selects a task location, corresponding to a task included in the received list of tasks, e.g., the task location that is listed first in the list of tasks. To select a task, task optimization program 120 evaluates the associated task locations in a sequential order in which they appear in a sequence of task locations that has the highest rating. For further details regarding ratings of task location sequences and the selection of such a sequence for use by task optimization program 120, see step 235.

In general, a specific task location is selected, by task optimization program 120, based, in part, on a rating respectively associated with the sequence of the task locations and on the association of tasks with specific task locations. The sequence of task locations that has the highest rating is used, by task optimization program 120, as a starting point to select a task location, where an associated task is to be performed. If specific locations have been associated with the tasks included in the list of tasks, then those locations are included in the sequence of task locations. In such a scenario, task optimization program 120 selects the task location that is listed at the beginning of the sequence of task locations and proceeds to step 225. If however, specific locations have not been associated with the tasks included in the list of tasks, then, to select a specific task location, in step 220, task optimization program 120 uses external feedback information, provided by search engine 130, to select a task location from the sequence of task locations.

For example, a user selects a task, e.g., "go to drycleaner". Optimization program 120 determines that a specific task location is not associated with that task. As such, task optimization program 120 uses external feedback information, provided by search engine 130, to select a task location based on a type of task location that is associated with the task "go to drycleaner". In some embodiments, task optimization program 120 compares the keywords included in a task to a database to identify and associate a type of task location with a particular task. In some circumstances, the retrieved types of task locations, provided by search engine 130, are based on a key word or key phrase search executed by task optimization program 120 via search engine 130. In this example, a key word search, provided by search engine 130, would include the word "drycleaner", which would generate a list of physical locations that offer dry-cleaning services. This list of physical locations, i.e., possible task locations, can be further refined, by search engine 130 in conjunction with task optimization program 120, and based on other information, such as the user location.

The selection of a specific task location, in the case where specific locations have not been associated with the tasks, can be further refined based on external information that is associated with specific task locations such as, for example, a rating, a review, a social media post, posted hours of operation. The selection of a specific task location can be further refined based on a schedule of other tasks the user must complete. For example, task optimization program 120 receives the task "get breakfast". Task optimization program 120 utilizes feedback, provided by search engine 130, which includes a set of reviews of restaurants that are within a five hundred meter proximity of the user, to select a restaurant which serves breakfast, has the highest average user satisfaction and has the shortest current queue of users. In this scenario, the shortest current queue of users refers to the shortest queue of patrons waiting to pick up orders, waiting to be seated etc.

After a task location is selected in step 220, task optimization program 120 retrieves GPS co-ordinates of the selected location from a search engine, such as search engine 130, in step 225.

In step 225 task optimization program 120 retrieves information that indicates the task location. In this embodiment, the task location includes GPS co-ordinates for the specified task location from a search engine such as search engine 130.

In step 230, task optimization program 120 calculates the travel time from the user location to the task location, based on the retrieved co-ordinates of the user location and the task location. For example, the travel time is calculated based on information received from a search for directions, via search engine 130, using the user location and the task location coordinates as query variables. Additional information used by task optimization program 120 to determine travel time can include, for example, a route to a task location, traffic patterns present within a route to a task, traffic patterns which emerge at various times during the day, or a weather forecast.

In decision step 235, task optimization program 120 determines whether the sequence in which the tasks, included in the list of tasks, are optimally organized such that the completion of those tasks in the specified order will result in an expenditure of a minimal amount of time on the part of the user. To check for such an optimal organization of the tasks, task optimization program 120 utilizes one or both of information included in the files and applications, which includes results generated by search engine 130, included with computing device 110 and external information included in the files and applications included with computing device 140. Task optimization program 120 uses this internal and external information to evaluate the organization of the tasks included in the list of tasks based on, for example, the expected duration of a task, the expected queue at a task location, traffic patterns present within a route to a task, traffic patterns which emerge at various times during the day, a weather forecast, or schedule constraints such as work or entries in a digital planner of the user, e.g., a digital calendar in user communication device 140 that includes scheduled social events. If the sequence in which the tasks are optimally organized (decision process 235, yes branch), then task optimization program 120 proceeds to decision step 240. If the sequence in which the tasks are not optimally organized (decision process 235, no branch), then task optimization program 120 proceeds to step 220.

To determine whether the tasks are in an optimal organization, task optimization program 120 generates a number of permutations of those tasks, i.e., possible sequences of those tasks, and assigns ratings to each possible sequence. For example, the list of tasks includes tasks A, B and C. The possible six permutations for those tasks are 1) A, B, C; 2) A, C, B; 3) B, A, C; 4) B, C, A; 5) C, A, B; and 6) C, B, A. The rating for each of the respective permutations is based, in this embodiment, on a total amount of estimated travel time, which is based on the external information received. The total amount of estimated travel time is the amount of time that is required for the user to travel to all the task locations, in the order specified by the sequence. In other embodiments, a subset of the tasks included in the sequence is used when determining a rating. For example, a user only has three hours of time available in which to complete tasks and the total estimated time to complete all the tasks in the list of tasks is seven hours, excluding travel time. As such, the user selects an option of task optimization program 120 that limits the rating assessment to only the first three tasks in a given sequence of tasks and adds a time limit, as criteria for determining sequence ratings, of three hours (i.e., a threshold). The first three tasks in sequence 1 have an estimated total travel time of forty five minutes and the tasks themselves are estimated to require a total of two hours to complete. The other possible sequences, 2-5, exceed the three hour time limit, and as such receive a lower rating that sequence 1. The sequence which receives the highest rating is determined to be the optimal organization of those tasks. As such, task optimization program 120 determines whether the sequence of the tasks included in the list of tasks match the sequence of tasks in the optimal organization of those tasks, i.e., the sequence with the highest rating. If task optimization program 120 determines that there is a match between the two sequences, then task optimization program 120 determines that the list of tasks is optimally organized.

In this embodiment of the present invention, task optimization program 120 determines which sequence includes the most optimal organization based on which sequence has the highest overall rating. However, in other embodiments, ratings are determined by task optimization program 120 based on one or more specific characteristics that a user chooses to optimize, such as an overall time to complete the list of tasks, a total amount of time spent waiting in queues, a total amount of time spent driving, or any other condition related to the completion of the list of tasks. In such embodiments the specific characteristics are presented as selectable thresholds or criteria that are applied to determine which sequence has the highest rating.

In decision step 240, task optimization program 120 determines whether the user location has changed, by re-calculating the location of the user, using an updated GPS location of user device 140, and comparing that location to the user location, which was calculated in step 210. If the user location has changed (decision process 240, yes branch) then task optimization program 120 proceeds to step 210. A change in user location is a change in location wherein the difference exceeds a predetermined threshold. For example, a user walking across a room is not a significant enough change in location to exceed the threshold. However, the user of user communication device 140 being five hundred feet away from the initial user location does exceed the predetermined threshold. In some embodiments, task optimization program 120 uses a ratio of the change in user location compared to the total distance between two determined user locations, determined in step 210, and the average distance between the task locations in the sequence to determine whether the user location has changed. For example, the average distance between task locations is 10,560 feet and the actual change in the user location is one hundred feet. The threshold requires that a ratio of actual change in the user location to average distance between task locations exceed 0.01. In this case, the ratio is 100/10,560 or approximately 0.0095, which is far less than 0.01. As such task optimization program 120 determines that the user location has not changed. If the location of the user has not changed (decision process 240, no branch), then the final prioritized list of tasks is created, based on the sequence that was determined to have the highest rating, and is passed to user communication device 140, in step 245.

Figure 3:
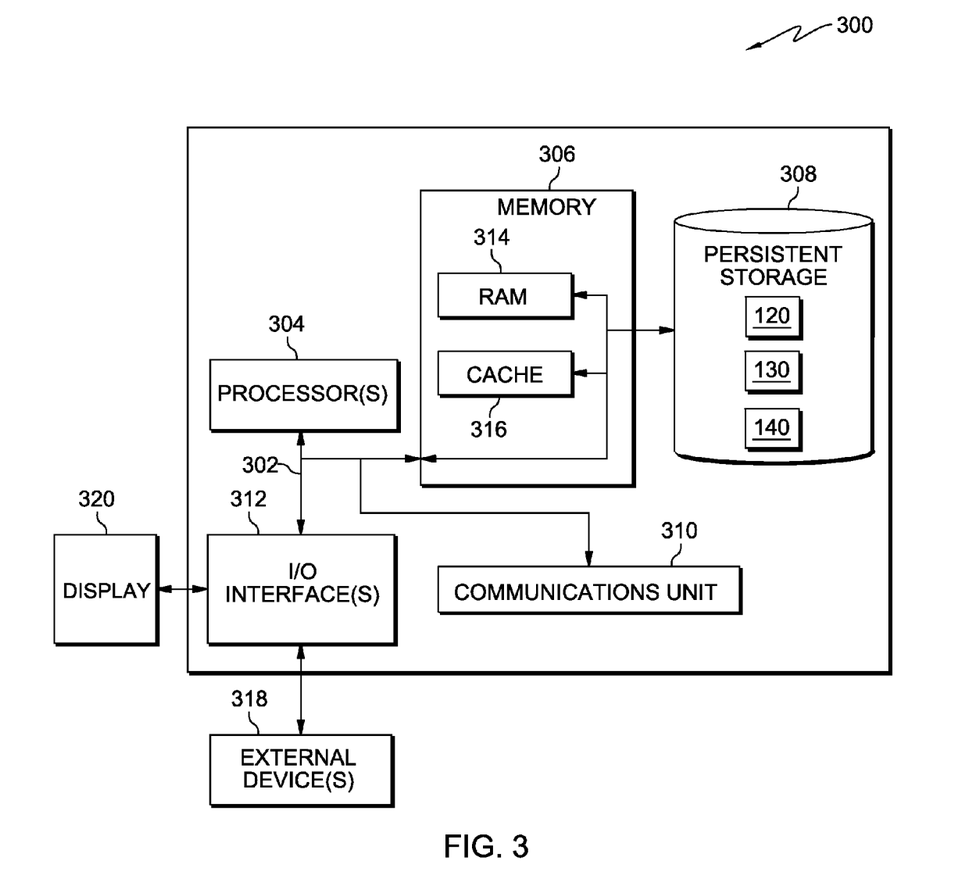
FIG. 3 depicts a block diagram of components of the computing device executing the task optimization program, in accordance with an embodiment of the present invention.

FIG. 3 depicts a block diagram, 300, of components of computing device 110 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 110 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 314 and cache memory 316. In general, memory 306 can include any suitable volatile or non-volatile computer-readable storage media.

Task optimization program 120 and search engine 130 are stored in persistent storage 308 for execution and/or access by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices, including resources of network 150 and user communication device 140. In these examples, communications unit 310 includes one or more network interface cards. Communications unit 310 may provide communications through the use of either or both physical and wireless communications links. Task optimization program 120 and search engine 130 may be downloaded to persistent storage 308 through network 150.

I/O interface(s) 312 allows for input and output of data with other devices that may be connected to computing device 110. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data used to practice embodiments of the present invention, e.g., task optimization program 120 and search engine 130, can be stored on such portable computer-readable storage media and can be loaded onto persistent storage 308 via I/O interface(s) 312. I/O interface(s) 312 also connect to a display 320.

Display 320 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) "Smalltalk" and the like may be subject to trademark rights in various jurisdictions throughout the world and are used here only in reference to the products or services properly denominated by the marks to the extent that such trademark rights may exist.

What is claimed is:

1. A method for prioritizing tasks, the method comprising:
    identifying, by a computer, a first location that is associated with a first task, based, at least in part, on a first information, wherein the first task is included in a first list of tasks;
    determining, by the computer, a first travel time from a second location to the first location based, at least in part, on a second information, wherein the second location is associated with a mobile device that supplied the first list of tasks, and wherein the second information includes data that indicates an amount of travel time that is associated with a route from the second location to the first location;
    generating, by the computer, a plurality of permutations of the tasks included in the first list of tasks, wherein each permutation, of the plurality of permutations, respectively includes at least two of the tasks included in the first list of tasks;
    selecting, by the computer, a first permutation from the plurality of permutations based, at least in part, on the first travel time;
    generating, by the computer, a second list of tasks based, at least in part, on the selected first permutation of the tasks, wherein an organization of the tasks included in the second list of tasks reduces at least a second travel time that is required to complete at least a portion of the tasks included in the second list of tasks; and
    communicating, by the computer, via a display device, one or more tasks of the second list of tasks to a user such that the user is aware of the second travel time that is required to complete at least the portion of the tasks included in the second list of tasks.

2. The method of claim 1, wherein the first information includes one or more of: (a) a street address that corresponds to the location associated with the first task, (b) a review of a business related to the completion of the first task (c) a global positioning system (GPS) coordinate of the location associated with the first task, or (d) a mode of transportation that is available based, at least in part, the second location.

3. The method of claim 1, wherein the second information includes one or more of: a) a degree of congestion for a mode of transit; b) a measured pattern of movement associated with a mode of transit; c) a pattern of movement for a mode of transit that is predicted to exist; d) a queue length for a mode of transit at the first location; e) a queue length for a mode of transit that is included in the route from the second location to the first location; f) a social media posting related to the first location that indicates a degree of congestion for a mode of transit; g) a current weather condition for the first location; or h) a forecasted weather condition for the first location.

4. The method of claim 1, the method further comprising:
    determining, by the computer, an updated location of the mobile device, based, at least in part, on an updated set of GPS coordinates of the mobile device;
    determining, by the computer, a third travel time based, at least in part, on the updated location of the mobile device and the location of a second task;
    selecting, by the computer, a second permutation from the plurality of permutations based, at least in part, on the updated location of the mobile device and the location of the second task; and
    generating, by the computer, a third list of tasks based, at least in part, on the selected second permutation of the tasks, wherein an organization of the tasks included in the third list of tasks reduces a third travel time that is required to complete at least a portion of the tasks included in the third list of tasks.

5. The method of claim 1, the method further comprising:
    determining, by the computer, a ranking for a given permutation included in the plurality of permutations, wherein the ranking for the given permutation is based, at least in part, on an amount of travel time required to complete at least a portion of the tasks included in the given permutation, and wherein the selection of the permutation from the plurality of permutations is further based, at least in part, on the ranking of the given permutation with respect to another permutation included in the plurality of permutations.

6. The method of claim 1, wherein one or both of the first information and the second information are retrieved from a digital data source.

7. The method of claim 1, wherein the first travel time and the second travel time are estimated by using both the first information and the second information as one or both of variables or data points that are applied to a given route to generate an estimated travel time that accounts for changes in an environment that includes that route.

8. A computer program product for prioritizing tasks, the computer program product comprising:
    one or more computer-readable storage media and program instructions stored on the one or more computer-readable storage media, the program instructions to perform a method, the method comprising:
        identifying, by a computer, a first location that is associated with a first task, based, at least in part, on a first information, wherein the first task is included in a first list of tasks;

determining, by the computer, a first travel time from a second location to the first location based, at least in part, on a second information, wherein the second location is associated with a mobile device that supplied the first list of tasks, and wherein the second information includes data that indicates an amount of travel time that is associated with a route from the second location to the first location;

generating, by the computer, a plurality of permutations of the tasks included in the first list of tasks, wherein each permutation, of the plurality of permutations, respectively includes at least two of the tasks included in the first list of tasks;

selecting, by the computer, a first permutation from the plurality of permutations based, at least in part, on the first travel time;

generating, by the computer, a second list of tasks based, at least in part, on the selected first permutation of the tasks, wherein an organization of the tasks included in the second list of tasks reduces at least a second travel time that is required to complete at least a portion of the tasks included in the second list of tasks; and communicating, by the computer, via a display device, one or more tasks of the second list of tasks to a user such that the user is aware of the second travel time that is required to complete at least the portion of the tasks included in the second list of tasks.

9. The computer program product of claim 8, wherein the first information includes one or more of: (a) a street address that corresponds to the location associated with the first task, (b) a review of a business related to the completion of the first task (c) a global positioning system (GPS) coordinate of the location associated with the first task, or (d) a mode of transportation that is available based, at least in part, the second location.

10. The computer program product of claim 8, wherein the second information includes one or more of: a) a degree of congestion for a mode of transit; b) a measured pattern of movement associated with a mode of transit; c) a pattern of movement for a mode of transit that is predicted to exist; d) a queue length for a mode of transit at the first location; e) a queue length for a mode of transit that is included in the route from the second location to the first location; f) a social media posting related to the first location that indicates a degree of congestion for a mode of transit; g) a current weather condition for the first location; or h) a forecasted weather condition for the first location.

11. The computer program product of claim 8, the method further comprising:

determining, by the computer, an updated location of the mobile device, based, at least in part, on an updated set of GPS coordinates of the mobile device;

determining, by the computer, a third travel time based, at least in part, on the updated location of the mobile device and the location of a second task;

selecting, by the computer, a second permutation from the plurality of permutations based, at least in part, on the updated location of the mobile device and the location of the second task; and generating, by the computer, a third list of tasks based, at least in part, on the selected second permutation of the tasks, wherein an organization of the tasks included in the third list of tasks reduces a third travel time that is required to complete at least a portion of the tasks included in the third list of tasks.

12. The computer program product of claim 8, the method further comprising:

determining, by the computer, a ranking for a given permutation included in the plurality of permutations, wherein the ranking for the given permutation is based, at least in part, on an amount of travel time required to complete at least a portion of the tasks included in the given permutation, and wherein the selection of the permutation from the plurality of permutations is further based, at least in part, on the ranking of the given permutation with respect to another permutation included in the plurality of permutations.

13. The computer program product of claim 8, wherein one or both of the first information and the second information are retrieved from a digital data source.

14. The computer program product of claim 8, wherein the first travel time and the second travel time are estimated by using both the first information and the second information as one or both of variables or data points that are applied to a given route to generate an estimated travel time that accounts for changes in an environment that includes that route.

15. A computer system for prioritizing tasks, the computer system comprising:

one or more computer processors;

one or more computer readable storage medium;

program instructions stored on the computer readable storage medium for execution by at least one of the one or more processors, the program instructions to perform a method, the method comprising:

identifying, by a computer, a first location that is associated with a first task, based, at least in part, on a first information, wherein the first task is included in a first list of tasks;

determining, by the computer, a first travel time from a second location to the first location based, at least in part, on a second information, wherein the second location is associated with a mobile device that supplied the first list of tasks, and wherein the second information includes data that indicates an amount of travel time that is associated with a route from the second location to the first location;

generating, by the computer, a plurality of permutations of the tasks included in the first list of tasks, wherein each permutation, of the plurality of permutations, respectively includes at least two of the tasks included in the first list of tasks;

selecting, by the computer, a first permutation from the plurality of permutations based, at least in part, on the first travel time;

generating, by the computer, a second list of tasks based, at least in part, on the selected first permutation of the tasks, wherein an organization of the tasks included in the second list of tasks reduces at least a second travel time that is required to complete at least a portion of the tasks included in the second list of tasks; and communicating, by the computer, via a display device, one or more tasks of the second list of tasks to a user such that the user is aware of the second travel time that is required to complete at least the portion of the tasks included in the second list of tasks.

16. The computer system of claim 15, wherein the first information includes one or more of: (a) a street address that corresponds to the location associated with the first task, (b) a review of a business related to the completion of the first task (c) a global positioning system (GPS) coordinate of the location associated with the first task, or (d) a mode of transportation that is available based, at least in part, the second location.

17. The computer system of claim 15, wherein the second information includes one or more of: a) a degree of congestion for a mode of transit; b) a measured pattern of movement associated with a mode of transit; c) a pattern of movement for a mode of transit that is predicted to exist; d) a queue length for a mode of transit at the first location; e) a queue length for a mode of transit that is included in the route from the second location to the first location; f) a social media posting related to the first location that indicates a degree of congestion for a mode of transit; g) a current weather condition for the first location; or h) a forecasted weather condition for the first location.

18. The computer system of claim 15, the method further comprising:
   determining, by the computer, an updated location of the mobile device, based, at least in part, on an updated set of GPS coordinates of the mobile device;
   determining, by the computer, a third travel time based, at least in part, on the updated location of the mobile device and the location of a second task;
   selecting, by the computer, a second permutation from the plurality of permutations based, at least in part, on the updated location of the mobile device and the location of the second task; and
   generating, by the computer, a third list of tasks based, at least in part, on the selected second permutation of the tasks, wherein an organization of the tasks included in the third list of tasks reduces a third travel time that is required to complete at least a portion of the tasks included in the third list of tasks.

19. The computer system of claim 15, the method further comprising:
   determining, by the computer, a ranking for a given permutation included in the plurality of permutations, wherein the ranking for the given permutation is based, at least in part, on an amount of travel time required to complete at least a portion of the tasks included in the given permutation, and wherein the selection of the permutation from the plurality of permutations is further based, at least in part, on the ranking of the given permutation with respect to another permutation included in the plurality of permutations.

20. The computer system of claim 15, wherein the first travel time and the second travel time are estimated by using both the first information and the second information as one or both of variables or data points that are applied to a given route to generate an estimated travel time that accounts for changes in an environment that includes that route.

* * * * *